United States Patent [19]

Conway

[11] Patent Number: 4,518,361
[45] Date of Patent: May 21, 1985

[54] METHOD AND APPARATUS FOR EFFECTING AND EVALUATING ACTION UPON VISUAL IMAGING

[76] Inventor: Malcolm J. Conway, Main Rd., Gill, Mass. 01376

[21] Appl. No.: 405,601

[22] Filed: Aug. 5, 1982

[51] Int. Cl.³ .............................................. G09B 7/04
[52] U.S. Cl. .................................. 434/307; 434/338; 434/350; 434/362; 434/219; 364/419
[58] Field of Search ............... 434/307, 308, 338, 350, 434/362; 273/DIG. 28; 364/419

[56] References Cited

U.S. PATENT DOCUMENTS

| | | |
|---|---|---|
| 12,049 | 12/1854 | Ames . |
| 1,971,119 | 8/1934 | O'Neil . |
| 3,162,959 | 12/1964 | Woolman . |
| 3,181,965 | 5/1965 | Tout . |
| 3,277,588 | 10/1966 | Lynott et al. . |
| 3,471,942 | 10/1969 | Weitzmann et al. . |
| 3,483,302 | 12/1969 | Ashkenas et al. . |
| 3,604,128 | 9/1971 | Homann . |
| 3,613,266 | 10/1971 | Conway . |
| 3,718,759 | 2/1973 | Raiffel . |
| 3,718,986 | 3/1973 | Hewitt . |
| 3,832,790 | 9/1974 | Weitzmann . |
| 3,913,245 | 10/1975 | McCanney . |
| 4,060,915 | 12/1977 | Conway . |
| 4,302,011 | 11/1981 | Pepper .............................. 273/85 G |
| 4,337,049 | 6/1982 | Connelly .............................. 434/247 |

FOREIGN PATENT DOCUMENTS 33387 11/1969 Israel .
33388 11/1969 Israel .

Primary Examiner—Richard C. Pinkham
Assistant Examiner—MaryAnn Stoll

[57] ABSTRACT

A method and apparatus for enhancing mental images of data in various visual environments utilizes an electronically generated visual display of an environment including datum references to be acted upon by the subject and a manipulative control which may be manipulated by the subject to electrically record at least two dimensions of an action taken by him to change a highlighted datum reference of the visual display. His action using the manipulatable control in response to the instruction is electronically recorded, and the dimensions of the recorded action are compared with the predetermined stored dimensions for the correct response to the given instruction. The results of the comparison are then presented to the subject. The method and apparatus may utilize concurrently an auditory environment corresponding to the visual environment and the actions taken by the subject may effect concurrent dynamic changes in the visual and/or auditory environments.

31 Claims, 9 Drawing Figures

METHOD AND APPARATUS FOR EFFECTING AND EVALUATING ACTION UPON VISUAL IMAGING

BACKGROUND OF THE INVENTION

The present invention relates to novel apparatus and methods for enhancing mental images and more particularly to such apparatus employing computer systems in connection with generation of visual displays, recording of student responses and subsequent display, of responses wherein multidimensional manipulation of a highlighted portion of a display is required, recorded and compared with predetermined correct responses to an instruction.

In U.S. Pat. No. 3,613,266, granted Oct. 19, 1971, there are disclosed a method and apparatus for enhancing the ability of individuals to form clear mental images of relatively complex data indicative of environments in which they may be called upon to perform tasks. By utilization of the methods and apparatus disclosed in this patent, an individual may be rapidly trained to react accurately to various situations which he may encounter in an actual working environment and other individuals may be maintained at high performance levels through avoiding skill degradation during periods of relative inactivity with respect to a given environment.

In U.S. Pat. No. 4,060,915 granted Dec. 6, 1977, there are disclosed an apparatus and method for effecting such enhancement process with computer storage and processing enabling complex sequences of instructions and responsive action and permitting interactive or dynamic action as well as more complex displays of the environment to be acted upon and introduction of variable auditory environment synchronized therewith. The enhanced capabilities of the electronically assisted method and apparatus have resulted in increasing the potential areas for application and in widespread interest in these methods for various training and remedial activities. However, there has also been substantial interest in increasing the complexity of the tasks that could be required of the subject and of the degree of complexity in the assessment of the subject's performance. Particularly significant in this regard is the incorporation of multiple components or dimensions in the nature of the response to a single instruction.

It is an object of the present invention to provide a novel method and apparatus for enhancing an individual's capacity to develop accurate mental images of complex information by use of rapid acting and variable electronic equipment for generating a visual display of an environment, for defining the areas of the visual display which may be acted upon, and for recording the action of the subject to alter data within that environment in response to instruction requiring at least two components or dimensions of manipulative action and thereafter presenting to the subject an image of the environment as changed by the instruction.

It is also an object to provide such a method and apparatus wherein there is provided concurrently an auditory environment corresponding to the visual environment and responsive to the manipulative changes made by the subject.

Another object is to provide such a method and apparatus in which the visual display and/or the auditory environment are altered concurrently with action of the subject in response to an instruction and to reflect the results of the manipulative action in response to the instruction.

A further object is to provide such a method and apparatus in which the visual image is changed a plurality of times in a concurrent sequential exercise to reflect a multiple set of instructions and the series of actions by the subject are recorded in response to the multiple instructions with respect to the changing images for subsequent comparison and presentation to the subject.

SUMMARY OF THE INVENTION

It has now been found that the foregoing and related objects may be readily attained by a method in which there is provided an electronically generated visual display of an environment simultaneously including a plurality of distinctive datum references within the displayed environment which may be acted upon by the subject. There is also provided data processing means with data storage means containing predetermined information relative to the datum references of said display including (i) a first condition of each datum reference to be acted upon, (ii) an instruction for action on each such datum reference to be acted upon, said instruction requiring at least two dimensions of manipulative action upon the datum reference and (iii) at least a second condition of each such datum reference representing the result of said at least two dimensions of action upon each such datum reference to be acted upon and following proper execution of the instruction with respect thereto. Means for manipulation by the subject is provided and coupled to the data processing means to electronically record in the data storage means the subject's actions to change at least two dimensions of the selected datum references of the visual display.

At least one of the datum references of the display is highlighted, and an instruction is provided to the subject requiring an action with the manipulatable means to change at least that one of the highlighted datum references of the visual display. This action requires at least two dimensions of manipulation with the manipulative means as to each such datum reference acted upon.

Electronically recorded are the dimensions of the actions of the subject on the highlighted datum references in response to the instruction to change any highlighted datum references of the visual display. The recorded dimensions of the subject's action on the appropriate datum reference are compared with the predetermined dimensions for change in condition of such datum reference in proper response to the given instruction, and the subject is presented with the results of such comparison. Preferably, the data storage means is disabled from receiving electrical signals resulting from such manipulative actions on other than the highlighted datum references of the visual display.

The two dimensions of manipulation may comprise starting location and direction of movement, or starting location and length of movement, or starting location, movement to a first point and then movement to a second point. In another embodiment, the two dimensions of manipulation may comprise selection of at least two graphically displayed components to be assembled or disassembled, and may include the order and placement in which such components are to be assembled or disassembled.

In another type of action, the two dimensions of manipulation comprise identification of a component to be articulated, the axis for articulation and the magnitude of articulation. Still another type will comprise location of a point at which force is to be applied, the direction in which the force is to be applied and the magnitude of the force. Yet another type of action will involve the graphic definition of the shape of a component to be introduced into the embodiment, and it may include location of the point for placement of such component on such visual display. An additional type of action will comprise selection of multiple text or numerical indicia, and may include indicating the order of selection of such multiple indicia.

In the most readily available apparatus, the electronically generated visual display comprises an electronic display upon a cathode ray tube. Most conveniently, the means for manipulation by the subject comprises a stylus cooperating with the cathode ray tube. Another advantageous means for manipulation by the subject in some learning programs may comprise a physically movable device simulating an operating instrument in the visual environment.

In accordance with one embodiment there is additionally provided an auditory environment corresponding to that of the visual display, and the action of the subject in response to the instruction may effect an alteration of the auditory environment.

Moreover, the visual display may be varied concurrently with the actions of the subject using the manipulatable means, or the results of the action may be stored invisibly to the subject with the display unaltered by such manipulative action. Moreover, the individual proper manipulative actions may be visually presented to the subject as a part of the presentation of the results of the comparison.

DETAILED DESCRIPTION OF THE ILLUSTRATED EMBODIMENTS

The general apparatus configuration for the practice of the present invention is similar to that illustrated and described in U.S. Pat. No. 4,060,915 granted Dec. 6, 1977. It is however, augmented by additional video components and enhanced data processing and storage capabilities and requirements. To the extent appropriate, the drawings and the diagrammatic illustration of that patent are utilized herein to facilitate understanding of the inventive concepts added herein.

Figure 1:
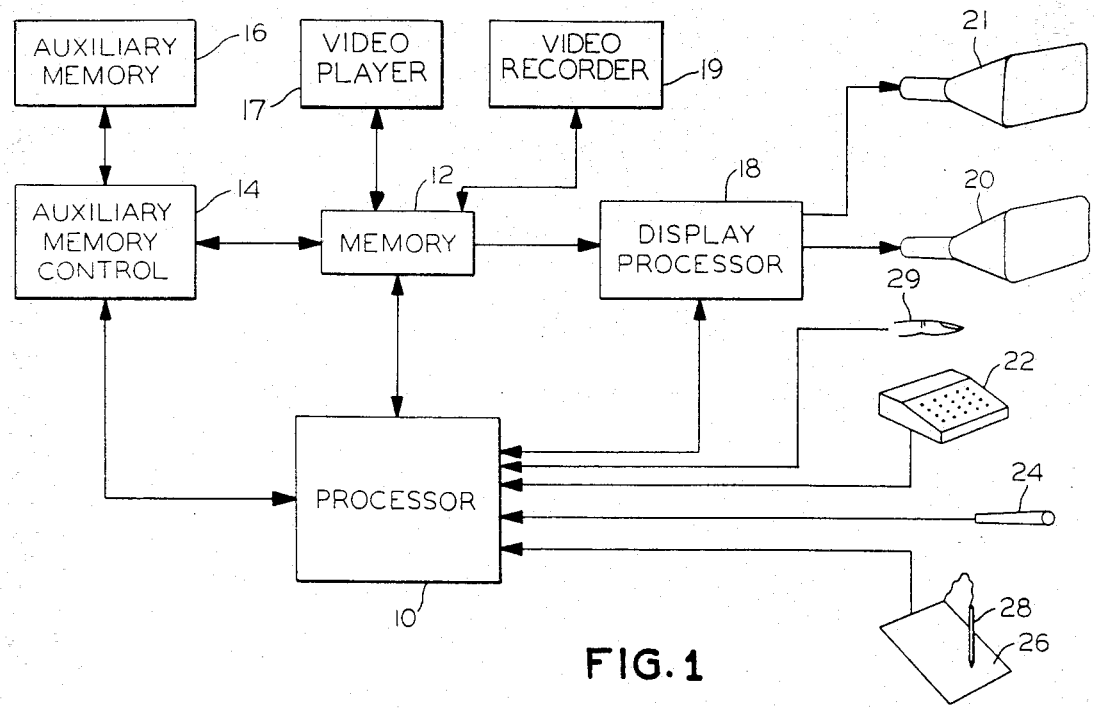
FIG. 1 is a diagrammatic illustration of apparatus embodying the present invention and for practicing the method of the present invention.

Turning first to FIG. 1 of the attached drawings, therein illustrated diagramatically is one form of apparatus for practice of the present invention. A computer has a module 10 designated "processor" containing high speed registers and an arithmetic unit plus a control unit capable of interpreting encoded instructions. The computer has a second module 12 designated "memory" and which contains stored data relative to a multiplicity of visual environments which may be presented to subjects undergoing training. In accordance with conventional computer design, the memory module 12 has the data stored therein and will retrieve specific data in response to signals generated by the processor module 10 or by other components of the apparatus as will be described more in detail hereinafter.

In the illustrated apparatus, the same computer or a separate computer includes a module 14 designated "auxiliary memory control" and a module 16 designated "auxiliary memory". The modules 14 and 16 function to provide additional elements of memory for data which may be only temporarily retained or which may be transferred into the memory module 12 upon demand or after desired processing, such as by using separate program discs for specific training programs. As indicated, the auxilary memory control module 14 receives its control directions from the main processor module 10 and directly or indirectly as a stored program is being executed. This form of auxiliary memory modules is advantageous in providing relatively low cost bulk storage of programs and data which are not used frequently or which are changed and which therefor need not be retained in the more expensive high speed memory module 12.

The module 18 designated "display processor" is designed to generate a multiplicity of prerecorded stored visual images of environments containing datum references to which the subject is to be exposed and is to react. The processor 18 may include electronic storage or conversion apparatus, or it may comprise other suitable means for generating the desired visual image of an environment. In the illustrated embodiment a video player 17 and a video recorder 19 are used as visual image source and recording devices and are under control of the processor 10. However, videotape, and magnetic images may all be stored and utilized by the display processor 18 as the source of the visual images, or the memory modules 12 and 16 may have stored therein electronic data convertible in the display processor 18 to generate the desired visual images on the cathode ray display device 20.

A second cathode ray display device 21 is available for generation of supplemental images or a "menu" for use by the subject in his training activity, as will be described more fully hereinafter.

In the diagrammatic illustration of FIG. 1, four alternate means are shown and manipulatable by the subject as he acts to change a datum reference of the environment of the display and they are coupled directly or indirectly to the processor module 10 so that his action is recorded electronically in the computer, most usually in the memory module 12.

The device 22 comprises a keyboard containing suitably coded keys which may be pressed by the subject to record the changes which he would make to the datum reference of the visual display.

The device 24 comprises a light pen or stylus of the type conventionally employed in connection with cathode ray tube display devices. The subject points the light pen 24 to portions of the visual display and the sensitivity of the light pen 24 to the light in the display indicates the portion of the display upon which the subject is attempting to act. A record of his action on the visual display is thus made by the computer processor 10.

The tablet 26 and stylus or pen 28 are of the type commonly known as a RAND tablet. Here the subject draws lines on the tablet as if he were drawing upon conventional paper and the movement of the pen 28 relative to the tablet 26 generates signals which are recorded through the processor 10.

The device 29 is a human finger which is useful in connection with display devices which may be sensitive to body heat, or to alteration of light patterns falling thereon.

Figure 2:
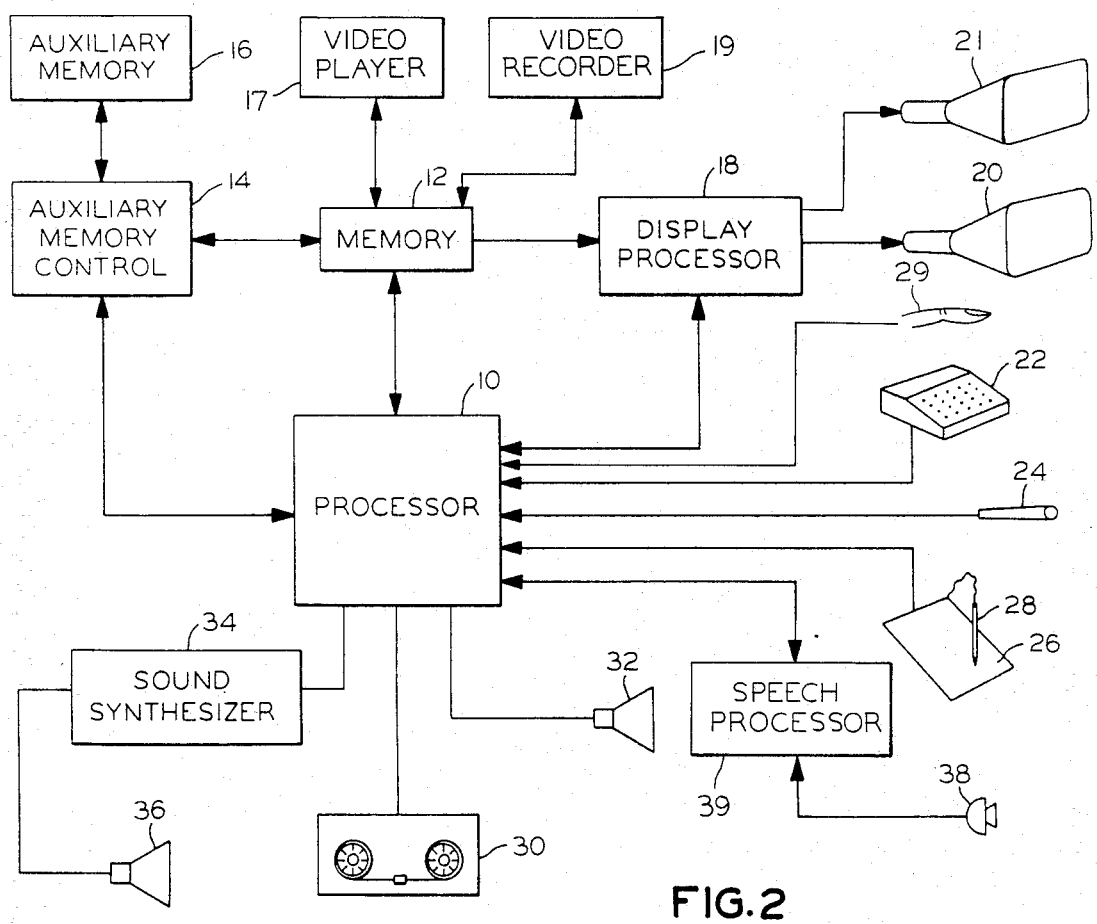
FIG. 2 is a similar diagrammatic illustration of such apparatus additionally including means for generating an auditory environment cooperating with the visual environment and for recording an auditory response of the subject.

In the embodiment of FIG. 2, the apparatus is augmented by means for providing an auditory environment and for recording an auditory response thereto. More particularly, there are coupled to the processor module 10 a tape recorder deck 30 or the like and a speaker 32, and a sound synthesizer 34 and its cooperating speaker 36. Upon signal from the processor module 10, either the tape deck 30, or the sound synthesizer 34, receiving stored signals from the data storage modules may provide a desired auditory environment cooperating with that environment visually displayed by action of the display processor 18 upon the cathode ray tube 20. In this embodiment, a verbal or other auditory response of the subject may be captured by the microphone 38, processed by the input speech processor 39 and recorded by the processor module 10 in the memory module 12.

In operation of the apparatus of FIGS. 1 and 2, the data concerning the environment for simulation of a learning experience is encoded and stored in the memory of the apparatus which may be the primary memory module 12 or the auxillary memory 18. A graphic display program for execution by the display processor 18 to produce a visual image of the environment on the cathode ray tube 20 is executed in the processor module 10. If so desired, the program executed in the processor 10 may include an auditory environment program which will actuate the tape deck 30 or sound synthesizer 34. The bulk of the graphic display will be stored in the video player 17 or video recorder 19, with additional input to the video processor 19 being provided by the memory module 12 and auxiliary memory module 16 under control of the processor 10.

Upon activation, the processor 10 causes the display processor 18 to produce the desired visual image of the learning environment on the cathode ray tube 20 and, if so programmed, an auditory environment through either or both the tape deck 30 or sound synthesizer 34. As the subject reacts with the input device or selected manipulatable means 22, 24, 28, and 29, the action taken by him is recorded electronically through the program in the processor 10 in either the memory module 12 or auxilary memory module 18 and also may be recorded in the video recorder 19.

If so established by the operating program, the processor 10 may then present a modified visual image on the display 20 reflecting either the action taken by the subject and now recorded, or a display of the environment as it would have been altered by the correct action taken. The subject then executes what he considers to be the proper steps to alter the same or a second datum reference of this visual image as a continuation of the original instruction or as a result of a second instruction, using any one of the means 22, 24, 28, and 29, and that action in turn is recorded in one of the memory modules 12, 16 through action of the processor module 10. It will be appreciated that a large number of sequential steps of environment change and recording of subject action may thus take place.

When an auditory environment is also provided as in the environment of FIG. 2, any verbal or auditory response by the subject may be recorded through the processor module 10 and the auditory environment may be varied to reflect the result of the correct action which should have been taken by the subject or the actual action which he may have taken.

In the apparatus of the present invention, the memory module 12 or auxilary memory 16 will normally contain the instructions for highlighting one or more defined areas or datum references of the visually displayed environment corresponding to the instruction being concurrently given. Moreover, the data processor 10 will normally be under instruction to ignore electronic signals from the input devices 22 et seq acting upon other than the highlighted datum references (or the appropriate one of the highlighted datum references) to be acted upon in response to concurrently given instructions.

In the present method and apparatus of the invention, the instructions and predeterminded responses stored in the module 12 and/or 16 require at least two dimensions of action upon the visually displayed environment, as will be more fully described hereinafter.

Either concurrently with recordation of the input signals or at a later point in the training exercise, the data processor 10 effects a comparison of the multiple dimensions of the subject's response to the instructions with the predetermined dimensions therefor stored in one of the memory modules 12, 16. The results of this comparison may be immediately and dynamically presented to the subject, or stored for later presentation at the end of the exercise or at some intermediate point. The results of the comparison may be presented visually on display 20, or audibly through the synthesizer 34, or both. Moreover, as indicated previously, the results may be graphically stored in the video recorder 19.

In the illustrated embodiment, the "display processor" module 18 generates the signals that directly produce the displays on the main display 20 and auxiliary display 21. The display processor 18, under control of the processor 10, accesses images from the video player 17 and encoded images from the digital processor 10, and generates the necessary signals to create a computer-generated image, a pre-recorded video image, or a composite display containing both pre-recorded video and computer-generated imagery on the graphics displays 20 and 21. The display processor 18 also generates the signals required to display symbology (characters and representations of physical parts) on the auxiliary menu display 21. The display processor 18 can provide three-dimensional views of the graphic stimuli and, by command of the human operator as effected by the processor 10, can change the orientation of the displayed stimuli.

The module 17 labeled "video player" is a device used to store pictoral information of the actual environment and is capable of being accessed by the processor 10 and display processor 18 to present signals to the display processor 18 for presentation to the graphics displays 20 and 21. The module 19 labeled "video recorder" provides a means for video recording both the displayed environments and the human responses, or the components thereof, for a portion of, or the entire, simulation period. Both the video player and video recorder may be conventional video tape recorders and video disk recorders, or any other equivalent devices.

As previously indicated, the graphics display 20 is a graphic output device capable of showing an image generated by the display processor 18. The auxiliary menu display 21 is an auxiliary display device for menu items, also generated or controlled by the display processor 18. Both the graphics display 20 and auxiliary menu display 21 in this embodiment are conventional cathode ray tubes or any other equivalent devices, and both provide a means for the human subject to control, select, or perform other responses acting on the processor 10 while using one of the imput devices.

In a preferred embodiment, following completion of the training exercise, the computer processor 10 draws from the memory module 12 or 16, the data concerning the appropriate changes to the datum references of the visual image as well as the data concerning the changes effected to the datum references by the action of the subject, including the several dimensions of each such predetermined action stored in the memory modules. Through action of the display processor 18, images of the datum reference as changed by the subject and as properly changed in response to the instruction are displayed on the screen of the cathode ray tube 20 for comparison evaluation. Such images may be presented side-by-side. When a series of sequenced instructions and reactive changes have been employed, then the computer processor 10 may sequentially display the appropriate comparison visual images of the changed datum references and the several dimensions thereof. If so desired, the computer processor 10 may draw upon the memory modules 12 and 16 to provide a more comprehensive analysis of the subject's response, such as time for reaction, evaluation of the action taken within a series of possible elective actions, and overall response to the sequence of instructions. The computer processor 10 desirably records either graphically on the video recorded 19 or electronically the subject's actions with respect to effecting changes in the visual image. In addition, during the comparison display of the visual images of the datum reference, the subject may be provided with graphic or auditory information to assist him in better evaluating the deficiencies in any response which he has made or in providing quantative measures of the correct image and dimensions of action and of his graphical reconstruction of the image and dimensions of action.

As will be readily appreciated from the foregoing description, the digital computer executes one or more programs controlling the operations of the system, and these programs are generally step-by-step descriptions of algorithmic processes which may be executed by the computer processor 10, display processor 18, and auxillary memory control 14. These steps may be encoded into language which is interpreted by the computer directly or which can be automatically translated into the language of the computer by another program. In accordance with conventional practice, suitable languages for description of algorithms for the computer include FORTRAN and the manufacturer's assembly language for the particular computer utilized.

The algorithms for generating a graphic or visual display are well known as are the algorithms for controlling graphic input devices. The algorithms for encoding an environment, for highlighting within that environment and for describing or producing a sequence of changes are a subset of the algorithms presently used for manipulating and displaying a graphic data base. The data for creating a graphic environment may also be stored in the memory modules 12, 16 of the computer or provided in the graphic storage devices 17, 19 of the display processor 18, as has been previously indicated. The algorithms for analyzing and evaluating the subject's response to a specific instruction will, of course, be specific to the particular training program and will be derived in part from the algorithms of the basic datum reference.

In addition to the cathode ray display device 20 which has been specifically illustrated, it will be appreciated that other suitable devices for presenting a visual display of the environment may be utilized so long as the display may be highlighted for defining the areas of response.

In addition to the manipulatable means specifically illustrated in FIGS. 1 and 2, other types of devices may be employed. For example, the subject may be provided with an instrument which he would normally manipulate in the environment for which he is being trained, such as the joy stick and throttle lever of an aircraft, or a control lever for some form of processing apparatus. Various embodiments of styli which cooperate with electrical, electronic or magnetic means to indicate movement are the type most conveniently employed. A stylus of the type known as a "mouse" or a "SRI-mouse" which generates a signal indicative of movement from an initial starting point may also be conveniently employed. Another type of stylus is a variable pitch stylus which can be rotated and provides to the computer the two dimensional angle of incidence between the stylus and the horizontal plane and also provides to the computer the force exerted by the subject on the stylus. Moreover, the input device may be a joystick with handle that can be tilted in any direction with the direction and extent of the handle movement being detectable by the computer.

Using the hereinbefore described input devices as the means for providing a multidimensional response to the computer system, the following are illustrative of the types of responses that may be made.

(a) identification of parts on the graphics display using light pen, keyboard, microphone, or other input devices.

(b) disassembly of parts on the graphics display by identification of two parts, their point(s) of contact, and means and/or method of disassembly.

(c) rotation or translation (articulation) of parts in three dimensions by identifying the part to be rotated or translated; the axis of rotation or translation; and the magnitude of rotation or translation.

(d) selection of special tools, equipment, or piece parts (screws, pins, shims, etc.) provided by the display processor on either the graphics display or the auxiliary menu display, or both.

(e) selection of multiple items of text or numerical values provided by the display processor on either the graphics display or the auxiliary menu display, or both.

(f) assembly of parts on the graphics display by identification of two parts, their point (s) of contact, and means of assembly.

(g) application of force on the displayed environment by identification of location, direction of force, and the magnitude of such force.

(h) input of accurate shapes and detail by use of a stylus template, capable of being maneuvered in a two-axis plane, and translated to the graphics display by definition of a series of points.

(i) modification of the stimuli rate or, in a multiple stimuli environment, multiple axis control or superposition of multiple stimuli on the graphics display, providing multiple simultaneous responses.

Figure 3:
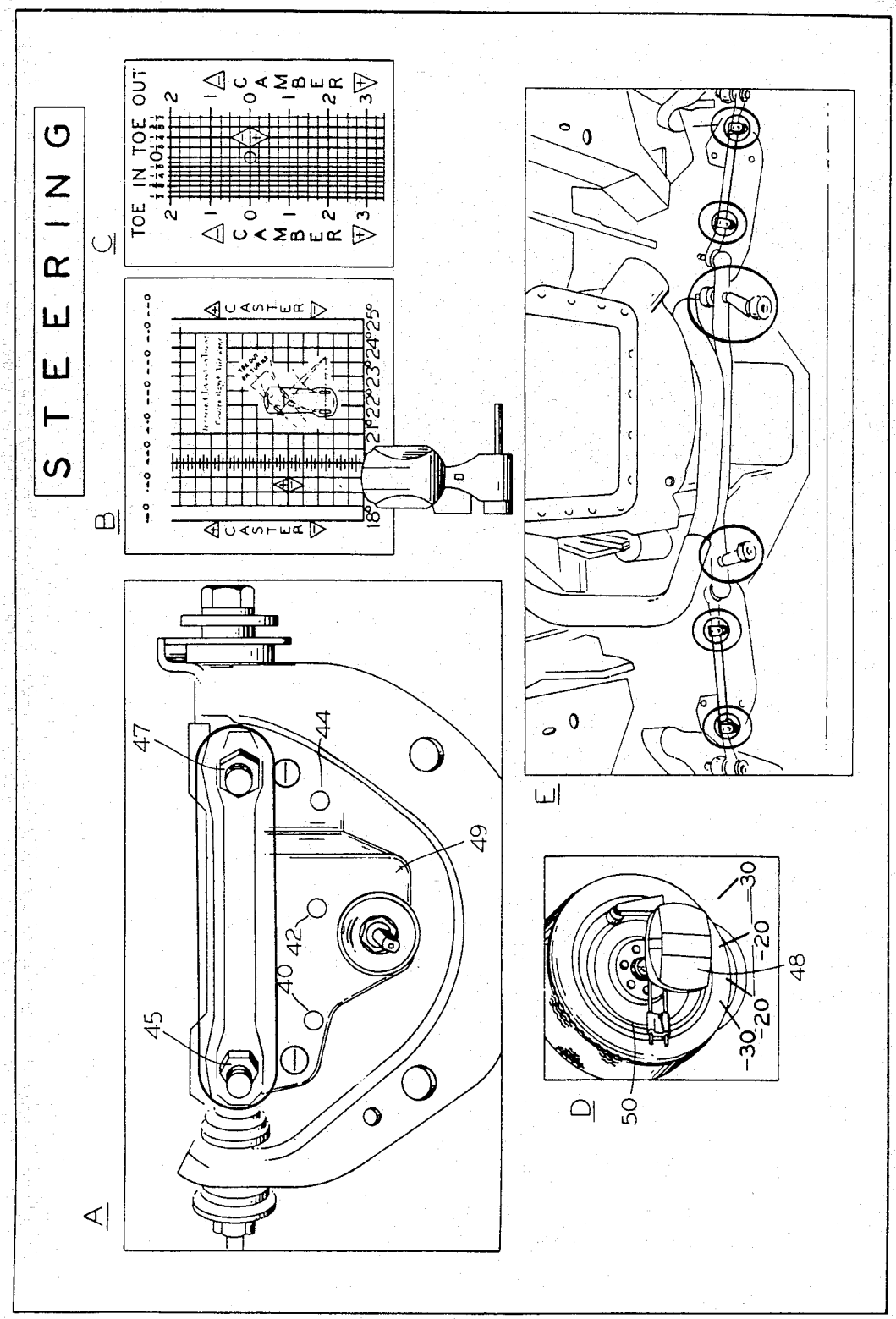
FIG. 3 is a diagrammatic illustration of a visual display of an environment relating to automotive repair and including highlighted datum references upon which action by the subject may be required by instructions given to the subject.

Turning now to FIG. 3, there is diagrammatically illustrated a visual display of an environment relating to wheel alignment of an automobile. The instrumentation in part depicted is suitable for measuring the caster, camber amd toe-in and toe-out of an automobile front end suspension, and the illustrations include the measuring apparatus, and the areas where adjustments are to be made on the suspension system are highlighted. In a training exercise utilizing this visual environment, the nominal task of the subject may be to indicate how he would adjust the suspension system to effect the adjustments to produce the desired measurements on the measuring apparatus.

In Subfigure A, the three principal adjustment points 40, 42, 44 for camber and caster are shown. In Subfigure B is provided the caster measurement scale, and Subfigure C provides the measurement scale for toe-in and toe-out and camber. These indicate specific parameters for caster, camber and toe-in for the particular adjustments being made by the subject. These parameters are stored in the computer as well as being dynamically displayed to the subject during his manipulative action in response to the instruction. Subfigure D illustrates the tool 48 which is attached to the automobile wheel 50 to take the several measurements and Subfigure E shows the adjustment area in which the process for toe-in and toe-out is effected.

The data for the datum references are stored in computer memory and the computer memory will also contain the data necessary to generate the highlighting of the datum references to be acted upon by the subject in response to the instruction, the highlighting being indicated by the closed curved lines in FIGS. 3A and 3E. Concurrently there are displayed to the subject the measurements then prevailing in the front wheel suspension by dots, light points or the like, on the appropriate scale of Subfigures B and C.

The subject responds to the instruction to adjust caster, camber and toe by identifying those parameters requiring adjustment as seen on the scales of Subfigures B and C and selecting one of those parameters to adjust. He indicates the adjustment he would make in either of Subfigures 3A and/or 3E by placing his stylus to indicate the point at which he would make the adjustment, the direction of movement of the adjustment which he would make and the extent of the adjustment while the computer indicates in Subfigure B or C the point on the scale dynamically resulting from the adjustment action.

For example, to adjust the assembly in Subfigure A, the subject must loosen both nuts 45, 47 by placing his stylus thereon and indicating rotation in the appropriate directon. He must then pivot the plate 49 until the desired adjustment has been reached by using his stylus as the "lever". He must then lock the nuts 45, 47.

After the desired sequence of instructions has been completed, the computer may then present on Subfigures A and/or E and B and/or C the datum reference or references both as manipulated by the action of the subject and as they should have been manipulated if the correct action had been taken in the event that the latter is different. The comparison display of the responses should desirably include a graphic representation of the several dimensions of the action(s) taken by the subject and the several dimensions of the proper action, all in the highlighted area of the environment within which the action is to be taken. Conveniently, when using the same visual display of the datum reference, i.e., a composite image of the type shown in FIG. 3, different colors are employed for the two "changed" images and sets of dimensions of action being displayed for comparison, all generated by the computer 10 or by the video player 17 in the instance of the original and "correct response" with the subject's reponse being computer superimposed.

Figure 4:
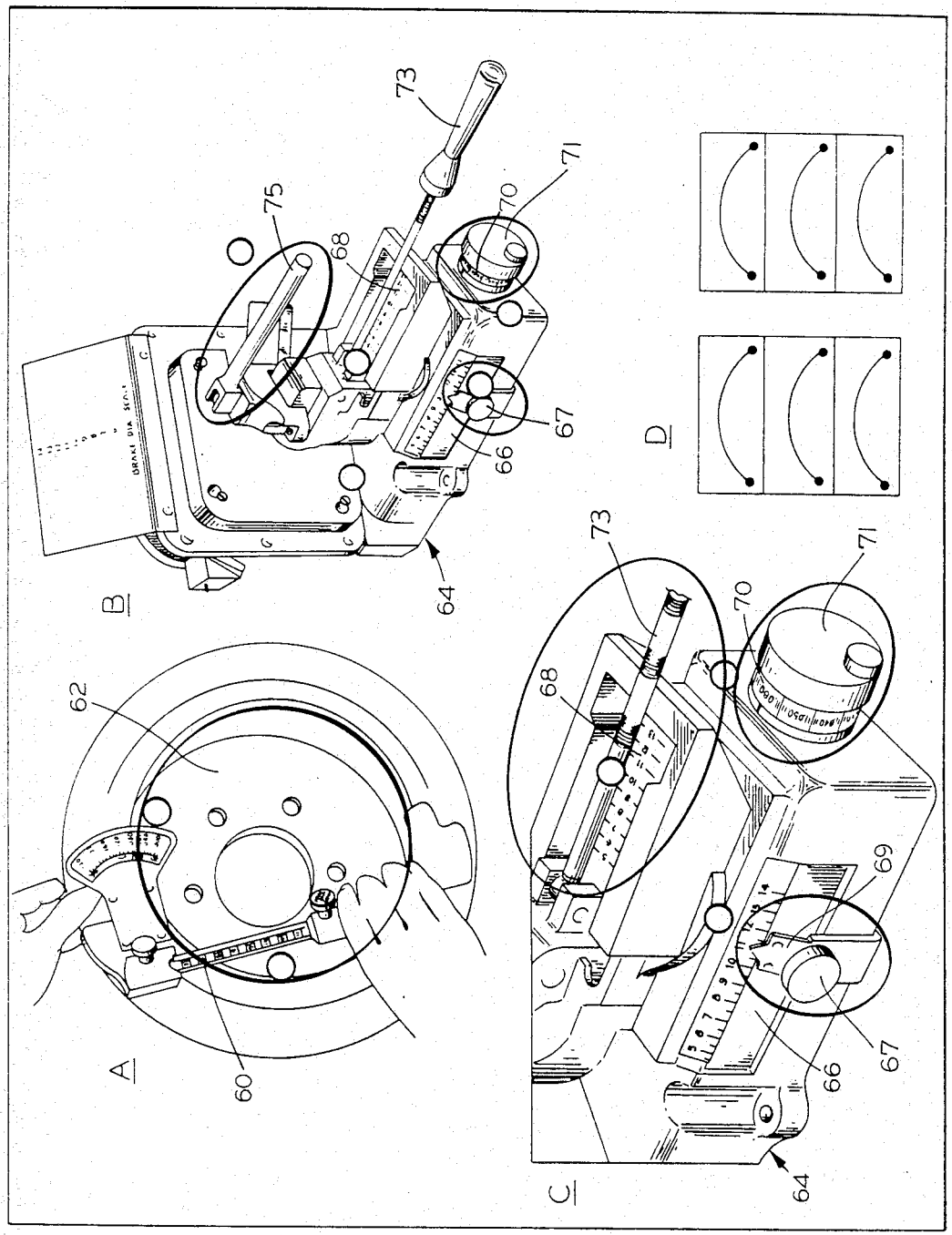
FIG. 4 is another illustration of a visual display of an environment including a multiplicity of highlighted datum references intended for cooperation with an auditory environment.

Turning now to FIG. 4, therein illustrated is an environment relating to a brake shoe burner and in which the subject is to be exposed to both a visual and an auditory environment. Subfigure A shows a radial micrometer 60 being used to read information from a brake drum 62; Subfigure B illustrates the brake shoe burner device generally designated by the numeral 64; Subfigure C enlarges the scales on the brake shoe burner device of Subfigure B; and Subfigure D shows sample arcs on the brake shoe.

In this particular exercise, an instruction is given to the subject to use a radial micrometer to effect adjustment of the brake shoe burner. He must first select the appropriate device, namely the radial micrometer 60, from the auxiliary menu device 21 by proper placement of his stylus and then place the micrometer on the visual display of FIG. 4A which is on the main display 20 as seen at 60 by manipulation of his stylus so that he can read the radial distances. He must next use his stylus to effect adjustment of the micrometer to measure the distances in Subfigure A. He must then indicate how he would use the readings on the micrometer in operating the brake shoe burner 64 of Subfigures B and C.

First, the subject must mount the brake shoe in the burner apparatus by pivoting the locking lever 73 from an upward position to the lowered position illustrated, the motion being effected by simulated movement of his stylus.

The subject should use the readings to set the upper and lower scales 66, 68 of the burner shown in Subfigures B and C. Utilizing his stylus 10 coupled to the computer processor, he "pulls" the finger latch 67 outwardly and slides the adjusting lever 69 to the appropriate setting on the scale 68. Similarly, the stylus is used to identify the adjusting dial 71 and to simulate rotation thereof in the appropriate direction until the appropriate setting on the scale 20 is reached.

In another manipulative step, the subject must identify the adjusting screw 73 and rotate it in the appropriate direction to reach the proper setting on the scale 68.

In all of these manipulations, the computer processor 10 and display processor 18 may be generating computer modification of the "controlled" elements and dynamic change in the indications on the scales, or the subject may merely signify the "controlled" element, the direction of movement and the "stopping" point on the scale itself. The movements of the stylus and the settings which he so establishes are recorded in computer memory.

After completion of any additional instructions and action by the subject, the computer program then displays in the graphic environment of FIG. 4 with appropriate lines to indicate the adjustment elements to have been manipulated, the direction (and amount) of manipulation and the appropriate settings, all as predetermined and stored in the computer memory, and as well as the "lines" and "settings" effected by the subject.

Figure 5:
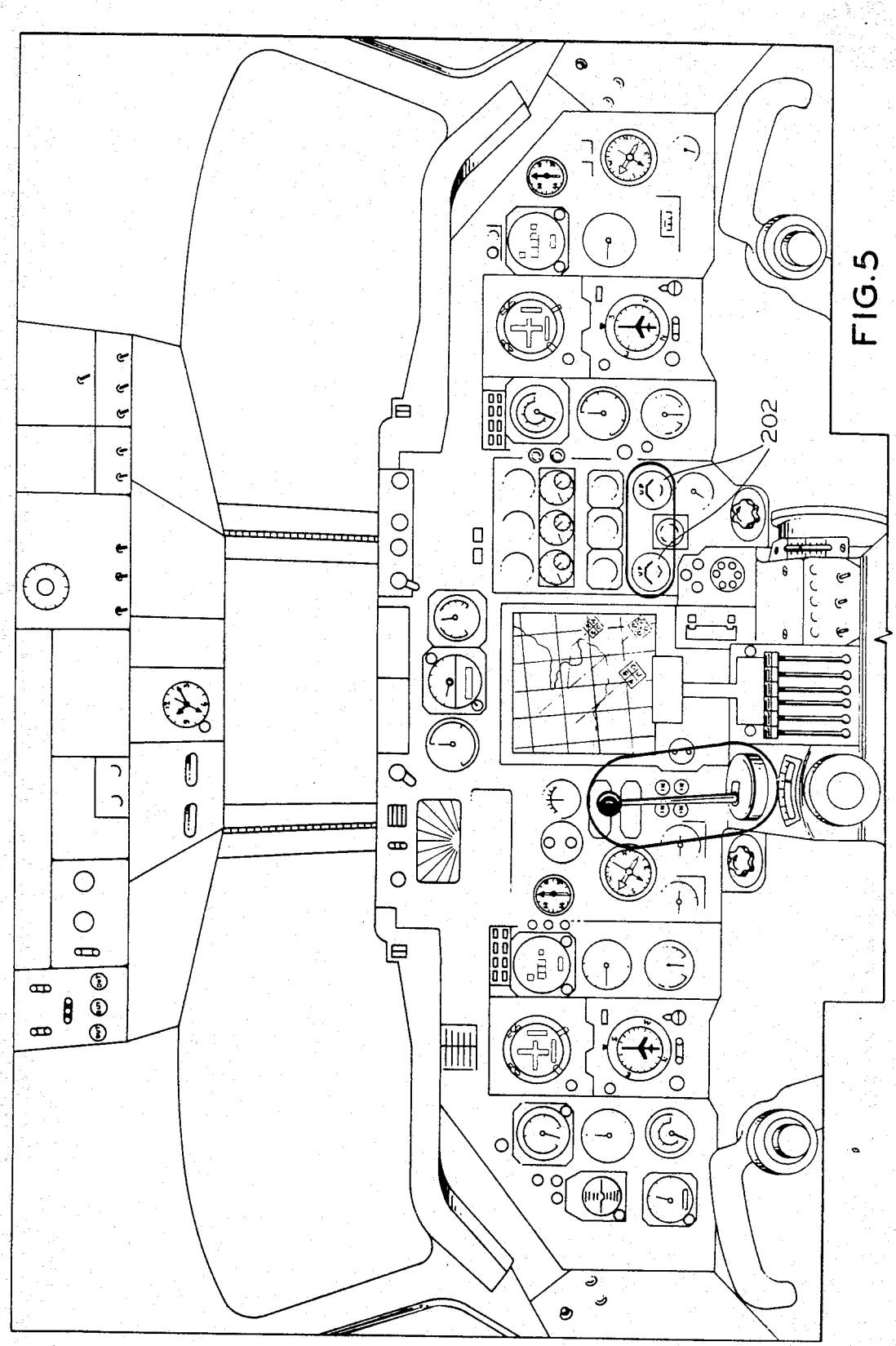
FIG. 5 is a fragmentary illustration of a highlighted visual display of an environment simulating the controls of a large jet aircraft.

Turning now to FIG. 5, this environment may conveniently combine a multiplicity of stimuli, namely, graphic, numeric and auditory and may compare responses by the subject which are not only manipulative but also auditory. This program involves following through a course of actions during operation of an aircraft, and involves a simulation of actions of the pilot and/or copilot. The computer is programmed to provide a calling action and the subject is required to respond to the calling action with a manipulative action, or with a manipulative action and verbal confirmation.

Figure 5A:
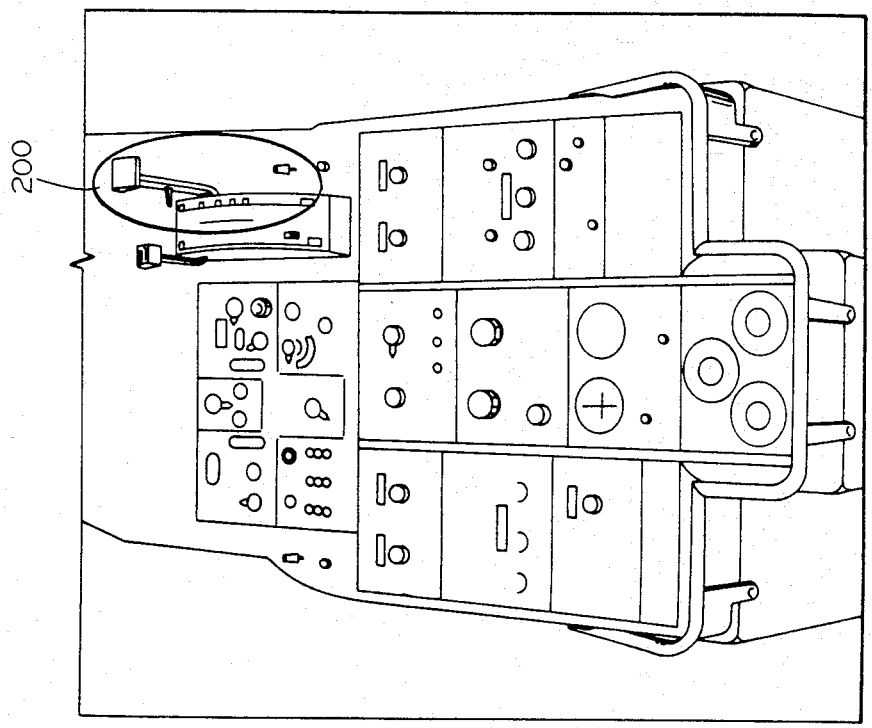
FIG. 5A is a continuation of the lower portion of the illustration of FIG. 5 to complete the visual display.

For example, the computer states "Down Flaps". The subject must first identify the flap lever 200 in the highlighted area of FIG. 5A and move it to the appropriate notch by movement of the stylus (not shown) and checking the required flap extension being dynamically indicated on the flap indicators 202 in the highlighted area of FIG. 5 and in the extended flap light display. At the appropriate indication, the subject withdraws the stylus from the flap lever 200 and states, "Flaps Down".

Figure 6:
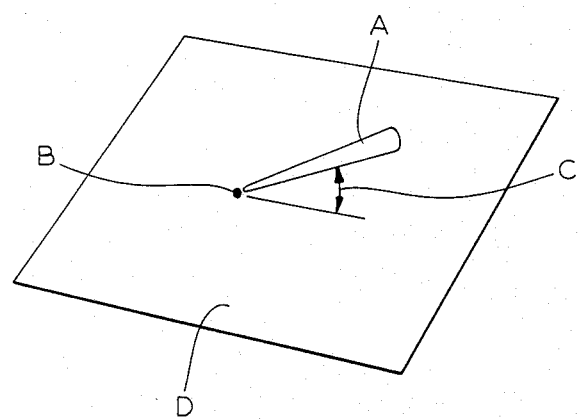
FIG. 6 is a diagrammatic illustration of one type of simulated multiple dimension manipulative action on a highlighted datum reference of a visual display.

In FIG. 6, there is diagrammatically illustrated a stylus A the variable pitch type being applied to a point B on the visual display D at an angle C to the plane surface. The axis of the stylus A and the angle included between the axis and the plane of the display indicates to the computer 10 the direction that force is being applied to the graphic element at Point B. The stylus also transmits signals representative of the magnitude of the force applied.

Figure 7:
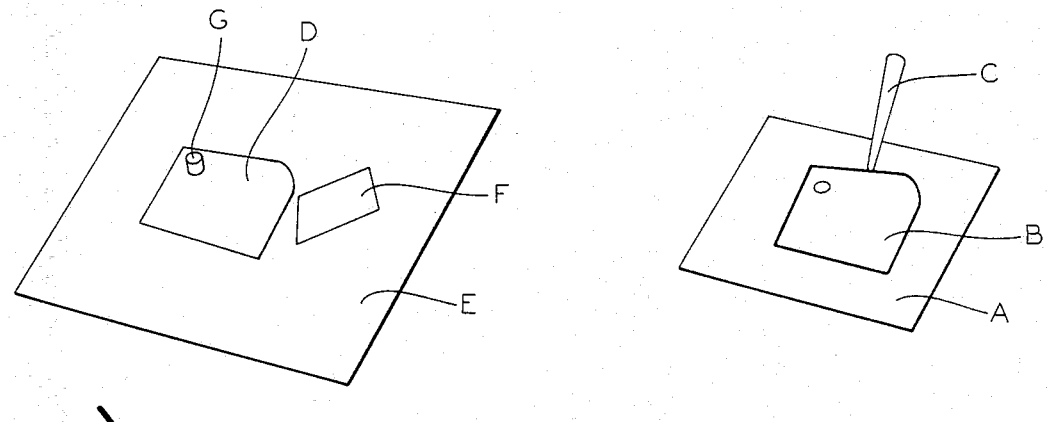
FIG. 7 is a diagrammatic illustration of a second type of simulated multiple dimension manipulative action on a highlighted datum reference of a visual display.

In FIG. 7, there is diagrammatically illustrated a menu or auxiliary display A upon which the subject is "drawing" a cam B with the stylus C. The subject is then to use his stylus to simulate placement of the part B on the part D of the main display E so that the arcuate shoulder abuts the part F and pivots about post G.

Figure 8:
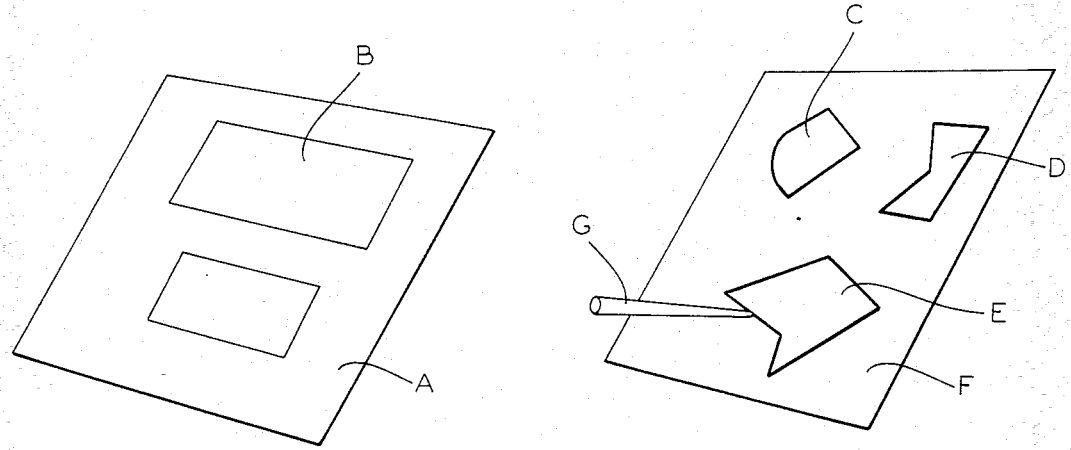
FIG. 8 is a diagrammatic illustration of a third type of simulated multiple dimension manipulative action on a highlighted datum reference of a visual display.

In FIG. 8, there is diagrammatically illustrated on the main display A a mechanical environment B into which are to be assembled a series of parts C, D, and E illustrated on the auxiliary display F. The subject uses the stylus G to select the parts C, D, E in the proper order for assembly and then to locate the point (and orientation) for placement of the part on the environment B of the main display A.

As is apparent from the foregoing examples, the present invention permits the subject to perform a set of multideimensional response functional tasks. Within the framework of the tasks to be done, there are several variations and deviations from the computer graphics system hereinbefore described that will perform the same functional tasks.

Generally, it can be seen that the operation of the system in performing the invention is as follows:

(a) The environment for a simulation or learning experience is encoded and stored in the memory of the system, either in auxiliary memory or in computer memory, or in both. A simulation program executing in the processor can operate on the environment description so as to control the display processor to produce an image of the environment on the graphics display, where the image is all or a portion of the environment. The environment may also include sound, voice, and movements of controlled mechanical devices, all of which are under control of the computer system.

(b) Included in the simulation of the environment may be video recording or still slides of the actual environment to be used in conjunction with computer-generated imagery to present the stimuli on the graphics display.

(c) The simulation of the environment also includes encoding and storing in memory the graphics for special hand tools, piece-parts, text, numerical tables, and all other support graphics required to perform the desired response. These functions may either be part of the main graphics display or presented on the auxiliary menu display, or both.

(d) A description of the sequence of stimuli for the subject is encoded and stored in the system. A program executing in the computer can analyze each stimulus and produce the stimulus on a computer output device in the correct sequence and at the correct time according to the prestored instructions in the encoding of the stimuli.

(e) A description of possible and expected responses, and the component dimensions, is encoded and stored in memory. The description includes the nature of each type of response, the magnitude (if pertinent), the stimulus which evokes the response, and the range of possible times in which the response is expected. The nature of the type of response includes description of the input device for the response, selection of possible menu items, and portions of the displayed stimuli to be acted upon. In some cases, a possible response may be a reorientation of the three-dimensional graphics display for clarification to the human subject.

(f) A human subject presents himself to the computer-controlled environment and initiates the simulation. At this point the computer outputs the initial environment, whether it be a graphics display, audio output, or any combination of the computer output means. The computer also outputs the menu items and/or other graphical aides and then begins to modify the environment according to the sequence of stimuli prestored in the computer system.

(g) The human reacts with an input device to inform the computer of his exact response as if the stimulus were real, or the human reacts with a representation of that response as would have been in a real environment. The human response may be an action to modify the displayed environment stimulus for clarification or it may be an input to perform a specific task on the displayed environment. The multi dimensions of the response to the stimulus is recorded and analyzed by the computer system under program control. If desired, the initial stimuli and the human response may be recorded on the video recorder.

(h) The computer system evaluates the dimensions of the response. The sequence of stimuli continues, possibly modified under program control because of the evaluation of the sequence of responses to stimuli.

(i) Under program control, the simulation experiment reaches a terminating condition, at which point a complete evaluation of the subject's responses is computed and reported to the subject.

The graphics computer system can be programmed to give as little or as much feedback to the human subject as desired during the course of simulation. Initially, the simulation may include graphic overlays, or other support stimuli, to provide indications of the desired response. Alternatively, the system can be used without extensive feedback to force the subject to develop a mental image of the effects of his actions while maintaining an accurate, but invisible, representation of those effects.

The computer assessment of the dimensions of the human response to the preprogrammed stimuli, once the response is recorded and analyzed, may take the form of:

(a) Immediate feedback to the graphics display to present in graphical form or in the form of nonvisual feedback the simulation response to the human input, whether it be a continuation to the next stimuli in the sequence or the display of a undesired response.

(b) An indication to the subject of the assessment for further clarification and/or correction by the human subject.

(c) Provision to the human subject feedback as to the type of response desired.

At any time the human subject can be given graphic cues to enable him to compare his own mental image with the correct image stored in the computer. Moreover, quantitative measures of the correct image and the human subject's graphical reconstruction of the image can be taken under computer control so the system may be programmed to varying degrees of selectivity, limiting the types of inputs, degree of input, or locations on the graphics display where operator response is recognized.

As used herein, the term "visual display of an environment" is intended to include static visual images, dynamic visual images and images which are composites of static and dynamic visual images.

Thus, it can be seen from the foregoing specific examples of application of the method and apparatus of the present invention, that the mental imaging concepts of the aforementioned U.S. Pat. No. 3,613,266 and No. 4,060,915 may be introduced into a highly dynamic environment, and complex and rapid instructions and instructional sequences may also be employed to require the subject to perform multidimensional tasks with or without dynamic feedback on the graphic display (and auditory environment). The use of video storage devices in conjunction with the display processor enables multicolored, complex and "three dimensional" displays for the environment, and the computer can generate highlights around the datum references to be acted upon. Preferably, the computer is disabled from storing signals resulting from efforts to act on other than the highlghted datum references.

Having thus described the invention, I claim:

1. In a method for developing an individual's capacity to form and utilize accurate mental images of data to which the subject has been previously exposed, the steps comprising:

a. providing an electronically generated visual display of an environment simultaneously including a plurality of distinctive datum references within the displayed environment which may be acted upon by the subject;

b. providing data processing means with data storage means containing predetermined information relative to said datum references of said display including (i) a first condition of each said datum reference to be acted upon, (ii) an instruction for action on each such datum reference to be acted upon, said instruction requiring at least two dimensions of action upon the datum reference, and (iii) at least a second condition of each such datum reference to be representing the result of at least two dimensions of action upon each such datum reference acted upon and following proper execution of the instruction with respect thereto;

c. providing means for manipulation by the subject coupled to said data processing means to electronically record in said data storage means the action to change said datum references of said visual display;

d. highlighting at least one of said datum references of said display and providing an instruction to the subject requiring an action with said manipulatable means to change at least said one of the highlighted datum references of said visual display, said action requiring at least two dimensions of manipulation with said manipulation means as to each such datum reference acted upon;

e. electronically recording at least two dimensions of the actions of the subject on the hightlighted datum references in response to the instruction to change any highlighted datum references of said visual display;

f. comparing the recorded dimensions of the subject's action on the appropriate datum reference with the predetermined dimensions for change in condition of such datum reference in proper response to the given instruction; and g. presenting to the subject the results of such comparison.

2. The method in accordance with claim 1 wherein said dimensions of manipulation comprise starting location and direction of movement.

3. The method in accordance with claim 1 wherein said dimensions of manipulation comprise starting location and length of movement.

4. The method in accordance with claim 1 wherein said dimensions of manipulation comprise starting location, movement to a first point and then movement therefrom to a second point.

5. The method in accordance with claim 1 wherein said dimensions of manipulation comprise selection of at least two graphically displayed components to be assembled or disassembled.

6. The method in accordance with claim 5 wherein said dimensions of manipulation include the order in which such components are to be assembled or disassembled.

7. The method in accordance with claim 1 wherein said dimensions of manipulation comprise identification of a component to be articulated, an axis for the articulation, and the magnitude of articulation.

8. The method in accordance with claim 1 wherein said dimensions of manipulation comprise location of a point to which force is to be applied, the direction in which the force is to be applied and the magnitude of the force.

9. The method in accordance with claim 1 wherein said dimensions of manipulation comprise definition of a shape of a component to be introduced into the visual display.

10. The method in accordance with claim 9 wherein said dimensions of manipulation include location of the point for placement of such component on such visual display.

11. The method in accordance with claim 10 wherein said dimensions of manipulation comprise selection of multiple text or numerical indicia.

12. The method in accordance with claim 11 wherein said dimensions of manipulation include indicating the order of selection of such multiple indicia.

13. The method in accordance with claim 1 wherein said data storage means is enabled to record electrical signals resulting from such manipulative actions on the highlighted datum references of said visual display and is disabled from recording electrical signals resulting from such manipulative actions on other than the highlighted datum references of said visual display.

14. The method in accordance with claim 1 wherein said electrically generated visual display comprises an electronic display upon a cathode ray tube.

15. The method in accordance with claim 14 wherein said means for manipulation by the subject comprises a stylus cooperating with said cathode ray tube.

16. The method in accordance with claim 1 wherein said means for manipulation by the subject comprises a physically movable device simulating an operating instrument in said visual environment.

17. The method in accordance with claim 1 wherein there is additionally provided an auditory environment corresponding to that of said visual display.

18. The method in accordance with claim 17 wherein said action of the subject in response to the instruction effects an alteration of said auditory environment.

19. The method in accordance with claim 1 wherein said visual display is varied concurrently with the action of the subject using said manipulatable means to effect the changes that the subject is seeking to effect.

20. The method in accordance with claim 1 wherein the actions of the subject are recorded invisibly to the subject.

21. The method in accordance with claim 1 wherein the results of the proper manipulative actions are presented in the visual environment as a part of said presentation of the result of said comparison.

22. Apparatus for increasing subject's capacity to form and utilize accurate mental images of data to which he has previously been exposed comprising:
 a. means for electronically generating a visual display of an environment simultaneously including a plurality of distinctive datum references which may be acted upon by the subject:
 b. data processing means with data storage means containing predetermined information relative to said datum references of said display including (i) a first condition of each said datum reference to be acted upon, (ii) an instruction for action on each such datum reference to be acted upon, said instruction requiring at least two dimensions of action upon the datum reference, and (iii) at least a second condition of each such datum reference representing the result of at least two dimensions of action upon each such datum reference to be acted upon and following proper execution of the instruction with respect thereto;
 c. means for manipulation by a subject coupled to said data processing means to electronically record in said data storage means the action taken to change any one of datum references of the visually displayed environments and adapted to record at least two dimensions of manipulative action;
 d. means for highlighting at least one of said datum references of the visual display;
 e. means for providing an instruction to the subject requiring an action with said manipulable means to change at least said one of the highlighted datum reference of said visual display, said instruction and action requiring at least two dimensions of manipulation of said manipulation means as to each such datum reference acted upon;
 f. means for electronically recording at least two dimensions of the actions of the subject on the highlighted datum references in response to the instruction to change any highlighted datum references of said visual display;
 g. means for comparing the dimensions of the recorded actions of the highlighted datum references in response to the instruction with the predetermined dimensions for change in condition of such datum reference in proper response to the instruction; and
 h. means for presenting to the subject the results of such comparison.

23. The apparatus in accordance with claim 22 wherein said manipulatable means and recording means will record starting point and direction of movement of said manipulatable means.

24. The apparatus in accordance with claim 22 wherein said manipulatable means will record an initial point for action on said display by said manipulatable means and the quantum of manipulative action.

25. The apparatus in accordance with claim 22 wherein said manipulatable means will record a point for articulative motion and the amount of articulation.

26. The apparatus in accordance with claim 22 wherein said apparatus includes means disabling said data storage means from recording electrical signals resulting from such manipulative actions on other than the highlighted datum references of said visual display, said means concurrently permitting receipt of electrical signals resulting from such such manipulative actions on the highlighted datum reference of said visual display.

27. The apparatus in accordance with claim 22 wherein said means for electrically generating a visual display includes a cathode ray tube upon which the visual display is presented.

28. The apparatus in accordance with claim 27 wherein said means manipulatable by the subject comprises a stylus cooperating with said cathode ray tube and said invisible recording means.

29. The apparatus in accordance with claim 22 wherein there is included means for generating an auditory environment corresponding to the environment of the visual display generated by said visual display generating means.

30. The apparatus in accordance with claim 29 wherein said auditory environment generating means is affected by action of the subject using said manipulatable means to effect a change in the auditory environment.

31. The apparatus in accordance with claim 22 wherein said manipulatable means concurrently varies the visual display generated by said visual display means.

* * * * *